(12) United States Patent
Eble et al.

(10) Patent No.: US 10,293,315 B2
(45) Date of Patent: May 21, 2019

(54) MAGNETIC STIRRER WITH SAW SENSOR

(71) Applicant: IKA—WERKE GMBH & CO. KG, Staufen (DE)

(72) Inventors: Erhard Eble, Bad Krozingen (DE); Thomas Hensle, Breisach (DE)

(73) Assignee: IKA—WERKE GMBH & CO. KG, Staufen (DE)

( * ) Notice: Subject to any disclaimer, the term of this patent is extended or adjusted under 35 U.S.C. 154(b) by 543 days.

(21) Appl. No.: 14/897,573

(22) PCT Filed: Mar. 13, 2014

(86) PCT No.: PCT/EP2014/000678
§ 371 (c)(1),
(2) Date: Feb. 1, 2016

(87) PCT Pub. No.: WO2014/202163
PCT Pub. Date: Dec. 24, 2014

(65) Prior Publication Data
US 2016/0151751 A1    Jun. 2, 2016

(30) Foreign Application Priority Data
Jun. 18, 2013 (DE) .................. 10 2013 010 275

(51) Int. Cl.
*B01F 13/00* (2006.01)
*B01F 15/00* (2006.01)
(Continued)

(52) U.S. Cl.
CPC .... *B01F 13/0818* (2013.01); *B01F 15/00175* (2013.01); *B01F 15/00266* (2013.01); *B01F 15/00396* (2013.01); *B01F 15/065* (2013.01); *B01L 7/00* (2013.01); *G01K 11/265* (2013.01); *G01K 13/08* (2013.01);
(Continued)

(58) Field of Classification Search
CPC ............ B01F 13/0818; B01F 15/00266; B01F 15/00175; B01F 15/00396; B01F 15/065; B01F 2015/062; B01L 7/00; B01L 2200/147; B01L 2300/023;
(Continued)

(56) References Cited

U.S. PATENT DOCUMENTS 7,075,216 B1 * 7/2006 Vetelino ................. G01H 11/08
310/333
7,748,893 B2 * 7/2010 Yaniv ................. B01F 13/0827
366/273

(Continued)

FOREIGN PATENT DOCUMENTS

DE         33 42 249 C2    7/1991
DE    10 2010 046426 A1    3/2012
(Continued)

*Primary Examiner* — Anshu Bhatia
(74) *Attorney, Agent, or Firm* — Budzyn IP Law, LLC

(57) ABSTRACT

The invention relates to a magnetic stirrer (1) having a stirrer drive (2), a heating plate (3) serving as a surface on which a stirring vessel (4) is positioned, and a stirring rod (6) which can be introduced into the stirring vessel (4), can be or is driven by the stirrer drive (2) and comprises a magnet (6a), the stirring rod (6) and/or the magnet (6a) having and/or containing at least one SAW sensor (7) (surface acoustic wave sensor).

20 Claims, 2 Drawing Sheets

Figure 1:
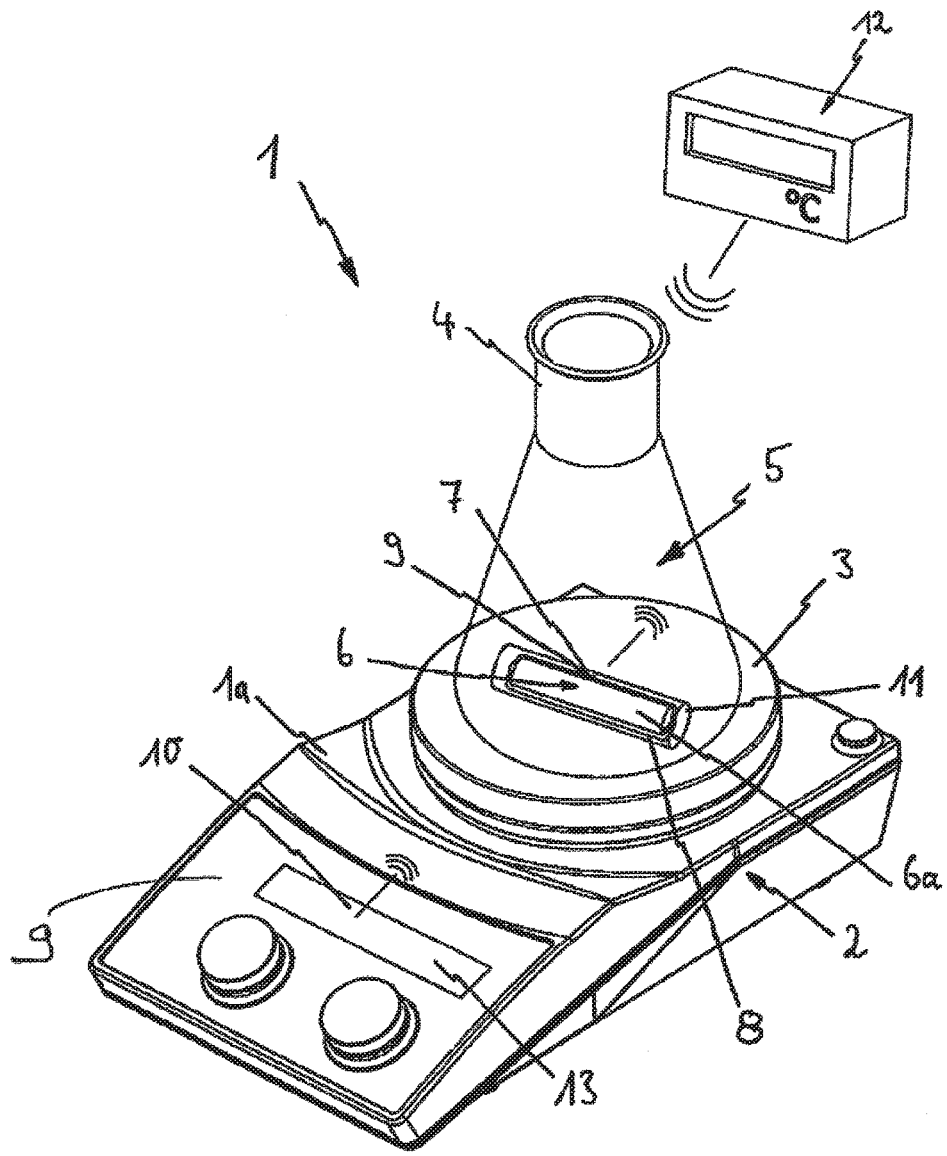

(51) Int. Cl.
*B01F 13/08* (2006.01)
*B01L 7/00* (2006.01)
*B01F 15/06* (2006.01)
*G01K 11/26* (2006.01)
*G01K 13/08* (2006.01)

(52) U.S. Cl.
CPC ... *B01F 2015/062* (2013.01); *B01L 2200/147* (2013.01); *B01L 2300/023* (2013.01); *B01L 2300/027* (2013.01); *B01L 2300/1827* (2013.01)

(58) Field of Classification Search
CPC ....... B01L 2300/027; B01L 2300/1827; G01K 11/265; G01K 13/08
USPC .................................................. 366/273, 274
See application file for complete search history.

(56) References Cited

U.S. PATENT DOCUMENTS

2005/0183582 A1* 8/2005 McFadden .......... B01F 13/0006
99/348
2012/0255347 A1* 10/2012 Ehara ................. G01N 27/4167
73/64.53

FOREIGN PATENT DOCUMENTS

| EP | 2287584 A1 | 2/2011 |
| EP | 2 527 808 A1 | 11/2012 |
| JP | 2010017626 A | 1/2010 |

* cited by examiner

MAGNETIC STIRRER WITH SAW SENSOR

This application is a National Stage Application under 35 U.S.C. § 371 of PCT Application No. PCT/EP2014/000678, filed, Mar. 13, 2014, which is incorporated by reference herein.

The invention relates to a magnetic stirrer having a stirrer drive and a heating plate as a surface on which a stirring vessel is positioned, and having a stirring rod which can be inserted into the stirring vessel and which can be driven by the stirrer drive and has a magnet.

Such magnetic stirrers are known in a wide variety of forms and allow the stirred medium to be heated up or otherwise temperature controlled while being stirred. Particularly in the case of stirring processes of longer durations, it may be necessary when doing so to monitor the temperature of the stirred medium to avoid the risk of overheating or boiling it dry.

From DE 33 42 249 C2, for example, a magnetic stirrer is known which is equipped for this purpose with a separate, rod-shaped thermometer as a temperature sensor which can be immersed into the stirred medium.

In this arrangement, the accuracy of the temperature measurement depends on the care with which a user positions the temperature sensor in the stirring vessel. Moreover, in some circumstances, for example when stirred goods are added or when samples are removed from the stirring vessel, such a temperature sensor which is submersible in the stirring vessel may be annoying and cumbersome for the user.

The problem therefore exists of creating a magnetic stirrer of the type defined above, in which the temperature of the stirred medium can be determined without a separate temperature sensor.

This problem is solved by the invention specified in Claim 1. Advantageous configurations can be obtained from the dependent claims.

According to the invention a magnetic stirrer is created, having a stirring drive and a hot plate as a surface on which a stirring vessel is positioned, and having a stirring rod which can be inserted into the stirring vessel, either is or can be driven by the stirring drive, and comprises a magnet, wherein the stirring rod and/or the magnet has and/or contains at least one SAW sensor (Surface Acoustic Wave sensor).

This means that temperature measurement does not require a separate part, which would either have to be immersed in the stirring vessel by a user or fixed to an edge of the stirring vessel, as necessary. Instead, the parts required for temperature measurement are located in the stirring rod and/or the magnet with which the stirred medium can be processed, and also in the magnetic stirrer.

The use of a SAW sensor for temperature measurement has the advantage that the operation of the sensor does not require its own power supply. Rather, the temperature measurement is effected by the induction of acoustic waves by means of the SAW sensor. The electrical signal required to do this is generated by the magnetic stirrer and transferred to the SAW sensor. In this way, the use of a SAW sensor provides a passive temperature sensor which, nevertheless, enables a wireless interrogation of the temperature of the stirred medium.

SAW sensors enable the determination of temperatures on the basis of the piezoelectric effect. This is done by applying an electrical input signal to the SAW sensor to induce acoustic waves. The acoustic waves generate a mechanical resonance in the SAW sensor, the frequency of which is temperature dependent. The SAW sensor generates an electrical output signal corresponding to the mechanical resonance. From the electric output signal, in particular from its frequency, the temperature at the SAW sensor can be deduced. Temperature changes bring about frequency changes in the signal returned by the SAW sensor.

For this purpose, the SAW sensor advantageously comprises a transducer for converting an electromagnetic signal into acoustic and/or mechanical waves, and/or converting acoustic and/or mechanical waves into an electromagnetic signal. The converter preferably comprises an interdigital transducer (IDT) which, for example, comprises a metallic structure on a piezoelectric substrate.

In an advantageous configuration the SAW sensor comprises one or more reflectors for reflecting and/or directing acoustic and/or mechanical waves onto the converter. By using reflectors, the resonance effect described above can be obtained in a particularly efficient manner.

The induction of acoustic waves in the SAW sensor is preferably controlled by a temperature interrogation device in the magnetic stirrer. For this purpose the temperature interrogation device generates an electrical signal, which is transmitted to the SAW sensor as an input signal. The output signal generated by the SAW sensor as described above is transmitted back to the temperature interrogation device where it is processed to determine the temperature. This allows all the active (i.e. power consuming) components required for determining temperature to be provided in the magnetic stirrer.

The SAW sensor with the stirring rod is immersed in the stirred medium, so that it does not impede the user when handling the stirring vessel, when adding stirred medium or stirred goods or when removing samples from the stirring vessel. In addition, the arrangement of the SAW sensor on the stirring rod is also convenient, because in its operating position the stirring rod is located in direct proximity to the heating plate. This allows the temperature of the stirred medium near the location of the heating plate to be determined, which may be advantageous in order to monitor the heating of the stirred medium and to avoid a possible overheating of the stirred medium during the stirring process.

The SAW sensor can be connected to a first antenna, arranged on the stirring rod, which is designed to receive electromagnetic signals and to transmit electromagnetic radiation generated by the SAW sensor.

The wireless signal transmission is particularly convenient because during operation in its operating position, the stirring rod rotates due to a rotating magnetic field which drives it.

It can be convenient if the magnetic stirrer has a second antenna, implemented in particular as a transmitter, from which the electromagnetic signal can be transmitted to induce acoustic waves in the SAW sensor.

In this case the stirring rod and the magnetic stirrer can be designed for contactless data transfer, in particular for transmitting the output signals generated by the SAW sensor, by means of high-frequency electromagnetic waves, preferably in the Megahertz or Gigahertz range, using their antennas. In this manner, it is possible to transmit signals from the SAW sensor from out of the stirring vessel to the magnetic stirrer, on the basis of which the temperature of the stirred medium inside the stirring vessel can be continuously determined and monitored during the stirring process.

The signal transmission can be facilitated if the SAW sensor and/or the first antenna are arranged on the outside of the stirring rod and/or on the outside of the magnet. This will allow the SAW sensor to be arranged as closely as possible to the stirred medium to be measured. The arrangement of the antenna on the outside of the stirring rod, or magnet, can also be advantageous in order to simplify a more stable wireless radio link between the SAW sensor and the second antenna, which is arranged for example on the magnetic stirrer and/or on its housing, and to reduce a possible absorption of the electromagnetic signal.

The signal transmission from the SAW sensor to the second antenna can be made even more stable if the first antenna is guided and/or wound lengthwise around the outside of the stirring rod and/or the outside of the magnet. Such a wound first antenna can have a sufficiently large loop length producing an advantageous effect, which can also be of significant benefit in particular for the induction of acoustic waves by the SAW sensor.

The stirring rod can assume a particularly compact shape if the stirring rod, the magnet, the SAW sensor and the first antenna have a common sheath, in particular one made of plastic. As a result of the sheathing, the stirring rod, the SAW sensor and the first antenna can be in particular airtight and/or watertight, and thus protected from corrosion or other damage caused by the stirred medium.

It can be advantageous if the SAW sensor and the first antenna are fixed to the stirring rod and/or the magnet by means of the sheath, and/or if the stirring rod is formed by the sheath and the sheathed parts. In this manner, separate fixing means and/or assembly steps can be avoided.

In order to keep the distance between the first antenna for the SAW sensor, which is arranged on the stirring rod or on the magnet, and the second antenna, arranged on the magnetic stirrer, as small as possible, the second antenna arranged on the magnetic stirrer can be arranged adjacent to the heating plate. In particular for the induction of electromagnetic waves, it can be advantageous if the distance between the two antennas is approximately equal to the radius of the heating plate, i.e. is as small as possible.

In a particularly advantageous embodiment of the invention, in order to display the temperature measurement determined using the SAW sensor, a display device arranged on the magnetic stirrer or a separate display device which is wirelessly connected to the magnetic stirrer, in particular by radio, can be provided. In this manner, it is possible to output the temperature reading, visually and/or acoustically if appropriate, to a user of the magnetic stirrer using the display device.

In particular in the case of a display device which is wirelessly connected to the magnetic stirrer, this device can be equipped with its own third antenna which has been set up for receiving an electromagnetic signal. It is then also possible for signals to be transmitted by the SAW sensor via its first antenna directly to the third antenna of the display device, where they are processed to determine the temperature measurements.

It is also possible that the magnetic stirrer is connected to a control and/or regulating device, via which the stirring drive and/or the heating plate of the magnetic stirrer can be controlled and/or regulated as a function of the determined temperature reading. This allows a value for the temperature to be predefined for the control and/or regulating device at which, as soon as the stirred medium has attained a temperature corresponding to this value, the heating plate is switched off in order to prevent overheating of the stirred medium. It is also conceivable to monitor the heating of the stirred medium by means of the determined temperature and, for example, to increase the rotation rate of the stirring drive using the control and/or regulating device, as soon as a temperature is measured that exceeds a predefined limit. Further cases of control and/or regulation are conceivable.

In another configuration of the invention, it is possible for the control and/or regulating device to be wirelessly connected, in particular by radio, to the magnetic stirrer and/or to the SAW sensor and/or to the display device, and/or to be designed for bidirectional transfer.

Preferably, the magnet can also be rod-shaped to match the stirring rod.

Figure 2:
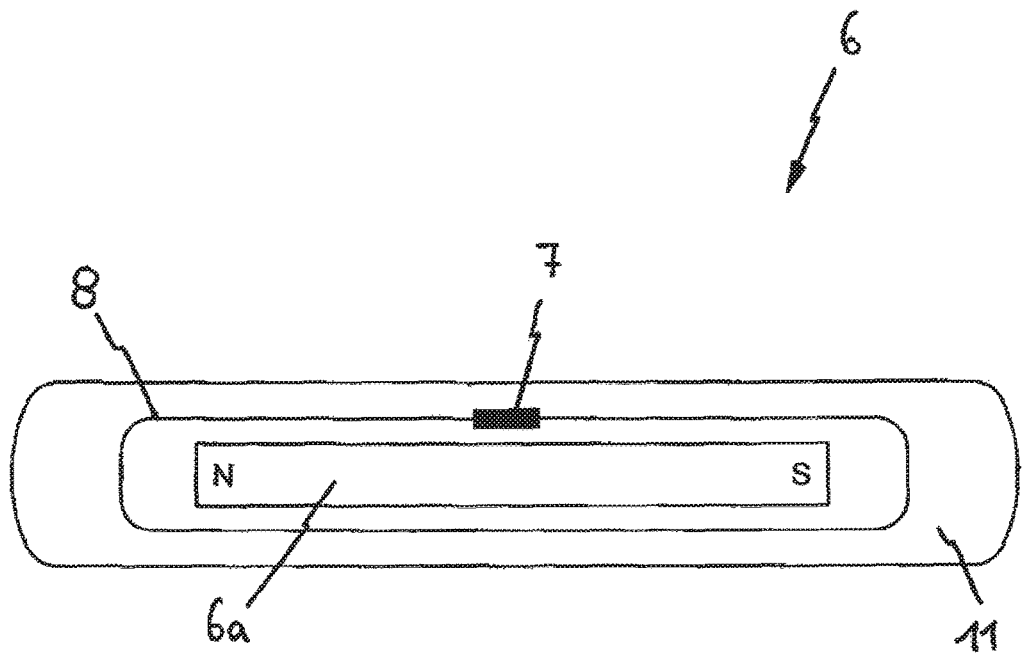
Figure 3:
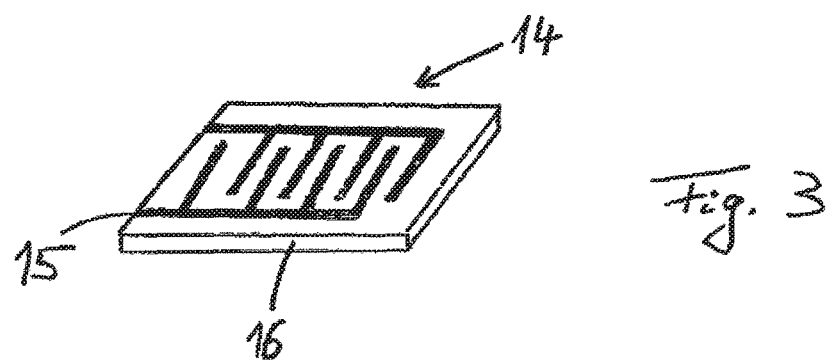

In the following, an exemplary embodiment of the invention is described in greater detail based on the drawings. These show, in schematic form:

FIG. 1 a perspective view of a magnetic stirrer according to the invention, with a stirring vessel placed on its heating plate and with a stirring rod located inside the stirring vessel having a rod-shaped magnet, which stirring rod has a SAW sensor, which is in a wireless data connection to the magnetic stirrer and to a separate, external display device via an antenna arranged in the stirring rod, FIG. 2 a longitudinal section of the stirring rod shown in FIG. 1 with the rod-shaped magnet arranged therein, the antenna and the SAW sensor, FIG. 3 an interdigital transducer IDT, which is provided in the SAW sensor.

FIG. 1 shows a magnetic stirrer 1 with a stirring drive 2 arranged therein, and with a heating plate 3 arranged in its upper side in the operating position. The heating plate 3 serves as a positioning surface for a stirring vessel 4, in the interior 5 of which stirring vessel 4 is a stirring rod 6.

From FIG. 2 it is particularly easy to see that the stirring rod 6 has a rod-shaped magnet 6a in its interior, which is set into rotation by a rotating magnet or by a rotating magnetic field of the stirring drive 2 and so serves to mix together a stirred medium located in the interior 5 of the stirring vessel 4.

The magnet 6a in the exemplary embodiment is rod-shaped and on one of its two ends has its North pole, designated by N, and on the opposite end its South pole, designated by S.

In an embodiment not shown however, the stirring rod 6, or the magnet inside the stirring rod 6, can also have an annular shape or the shape of a ring which is either oval, elliptical or polygonal, in particular three-sided or four-sided or five-sided or hexagonal.

To determine the temperature of the stirred medium, the stirring rod 6 or the rod-shaped magnet 6a has a SAW sensor 7 (Surface Acoustic Wave sensor) as a temperature sensor. SAW-based temperature sensors exploit the piezoelectric effect. In this, acoustic or mechanical waves are induced by the SAW sensor by means of an electrical input signal and then converted back into an electrical output signal. The frequency of the waves generated in this manner is temperature-dependent, so that the temperature of the stirred medium can be derived from the frequency of the output signal.

In particular, the temperature of the stirred medium is determined in the following steps:

a temperature interrogation device 9 produces a high-frequency electrical signal that is converted into an electromagnetic wave by an antenna 10 which is arranged on the magnetic stirrer 1 or on its housing 1a. The electromagnetic wave is received by an antenna 8 arranged on the stirring rod 6 and converted into a high-frequency electrical signal (input signal). An interdigital transducer (IDT) 14, which is arranged in or on the SAW sensor 7, is excited by the input signal into generating acoustic waves. The acoustic waves are reflected back onto the IDT 14. For this purpose, the SAW sensor preferably comprises reflectors. This means that a resonant cavity is created, wherein the resonance frequency is dependent on the temperature. The IDT 14 converts the natural frequency of the resonator into an electrical signal (output signal), which is converted via the antenna 8 into an electromagnetic signal which is transmitted to the antenna 10 on the magnetic stirrer 1, where it is then processed to determine the temperature by means of the temperature interrogation device 9.

FIG. 3 shows a schematic diagram of the IDT 14. The IDT 14 is used for converting electrical signals into acoustic waves and vice versa. The IDT 14 comprises a piezoelectric substrate 16, on which electrodes 15 are mounted. The electrodes are formed by two comb-shaped structures, preferably composed of metal. The piezoelectric substrate 16, for example, is made of quartz or lithium niobate.

The use of the SAW sensor 7 has the advantage that a temperature sensor is created which does not require its own power supply, for example from a battery or capacitor. This allows the SAW sensor to be conveniently arranged in or on the stirring rod. The arrangement of the SAW sensor 7 on the stirring rod 6 has the advantage that the temperature of the stirred medium can be determined in an area immediately above the heating plate 3 where the heat input into the stirred medium takes place and the risk of overheating is greatest. It is therefore possible to detect, for example, an increase in the temperature of the stirred medium beyond a certain limit with the SAW sensor 7 as directly as possible, i.e. without or with only a small delay.

According to the figures, the SAW sensor 7 is connected to the antenna 8 arranged on the stirring rod 6, said antenna 8 being designed for sending and receiving electromagnetic signals. The antenna 8 in the exemplary embodiment according to FIG. 2 is a wire coil or loop encircling the rod-shaped magnet 6a.

The electromagnetic field can be transmitted by the antenna 10, which is arranged either on the magnetic stirrer 1 or on its housing 1a. The electromagnetic field emitted by the antenna 10 is detected by the antenna 8 arranged on the stirring rod 6 and used, as described above, to generate the electrical input signal for the IDT 14.

To enhance the transmission of the electromagnetic field of the antenna 10, the antenna 8 is arranged on the outside of the rod-shaped magnet 6a. The SAW sensor 7 and the energy storage device 9 are also located on the outside of the rod-shaped magnet 6a.

As is particularly easily seen in FIG. 2, in order to increase the antenna length of the antenna 8, this is guided, or wound around, the outside of the stirring rod 6 or the outside of the rod-shaped magnet 6a lengthwise. As FIG. 1 also shows, the stirring magnet 6a, the SAW sensor 7 and the antenna 8 have a common sheath 11, which preferably consists of plastic and which together with the sheathed parts forms the stirring rod 6. To improve the thermal conduction however, the sheath can also be constructed wholly or in part from stainless steel or ceramic.

The sheath 11 is used to secure the SAW sensor 7 and the antenna 8 to the stirring rod 6. The sheath 11 can, in particular if it is composed of plastic, be cast around the stirring rod 6 or the rod-shaped magnet 6a, the SAW sensor 7 and the antenna 8, so as to encapsulate this in an airtight and/or watertight manner and protect it against damage and corrosion.

The antenna 10 provided on the magnetic stirrer 1 is arranged adjacent to the heating plate 3. The antenna 10 can be arranged on the outside of the housing 1a of the magnetic stirrer 1 or inside the housing 1a of the magnetic stirrer 1.

In order to display the temperature reading determined with the temperature interrogation device 9, in accordance with FIG. 1 a display device 12 is provided that is wirelessly connected, in particular by radio, to the magnetic stirrer. In an embodiment of the invention which is not shown, it can be provided that this display device 12 is either connected to the magnetic stirrer 1 via a cable or arranged directly on the magnetic stirrer 1 itself.

It is also possible to indicate the determined temperature readings in a display 13 on the housing 1a of the magnetic stirrer 1, which is visible in FIG. 1.

The magnetic stirrer 1 is also connected to a control and/or regulating device located inside it. Using the control and/or regulating device, the stirring drive 2 and/or the heating plate 3 of the magnetic stirrer 1 can be controlled or regulated as a function of the determined temperature readings.

In an embodiment of the invention which is not shown, the said control and/or regulating device can also be wirelessly connected, in particular by radio, to the magnetic stirrer 1 and/or to the SAW sensor 7 and/or to the display device 12, and/or be designed for bidirectional data transfer, so that the control and/or regulating device can also be implemented as an external, separate part.

The magnetic stirrer 1 has a stirring drive 2 and a heating plate 3. The heating plate 3 of the magnetic stirrer 1 serves as a surface for positioning the stirring vessel 4, into which the stirring rod 6 driven by the stirring drive 2 can be introduced. In order to monitor the temperature of the stirred medium located in the interior 5 of the stirring vessel 4, the stirring rod 6 has the at least one SAW sensor 7. The SAW sensor 7 is connected to the first antenna 8, arranged on the stirring rod 6. The second antenna 10, which is arranged adjacent to the heating plate 3, is provided on the magnetic stirrer 1 or on the housing 1a. A temperature interrogation device 9 determines the temperature of the stirred medium by means of the electromagnetic waves which are induced by the SAW sensor 7 and transmitted by the antenna 8 to the antenna 10.

LIST OF REFERENCE NUMERALS 1 magnetic stirrer
2 stirring drive
3 heating plate
4 stirring vessel
5 interior
6 stirring rod
6a magnet
7 SAW sensor
8 antenna
9 temperature interrogation device
10 antenna
11 sheath
12 display device
13 display
14 interdigital transducer
15 electrodes
16 piezoelectric substrate

The invention claimed is:

1. Magnetic stirrer (1) having a stirring drive (2), a heating plate (3) serving as a surface on which a stirring vessel (4) is positioned, the stirring vessel (4) configured to accommodate a medium, and a stirring rod (6) for introduction into a medium accommodated in the stirring vessel (4), the stirring rod (6) configured to be driven by the stirring drive to stir the medium accommodated in the stirring vessel (4), the stirring rod (6) including a magnet (6a), and at least one SAW sensor (7), wherein the at least one SAW sensor (7) includes a transducer configured to generate acoustic and/or mechanical waves in response to input electrical signals, the transducer further configured to generate output electrical signals based on receiving acoustic and/or mechanical waves.

2. Magnetic stirrer (1) according to claim 1, wherein the transducer is formed by an interdigital transducer IDT.

3. Magnetic stirrer (1) according to claim 2, wherein the IDT comprises a metal structure on a piezoelectric substrate.

4. Magnetic stirrer (1) according to claim 1, wherein the SAW sensor comprises one or a plurality of reflectors for reflecting and/or directing acoustic and/or mechanical waves onto the transducer.

5. Magnetic stirrer (1) according to claim 1 to, wherein the SAW sensor (7) is connected to a first antenna (8) arranged on the stirring rod (6), and wherein the first antenna (8) is designed for receiving electromagnetic waves which are converted to the input electrical signals and for sending output electromagnetic waves based on the output electrical signals generated by the transducer.

6. Magnetic stirrer (1) according to claim 5, wherein the SAW sensor (7) and/or the first antenna (8) are arranged on the outside of the stirring rod (6) and/or on the outside of the magnet (6a).

7. Magnetic stirrer (1) according to claim 5, wherein the first antenna (8) is guided and/or wound lengthwise around the outside of the stirring rod (6) and/or around the outside of the magnet (6a).

8. Magnetic stirrer (1) according to claim 5, wherein the stirring rod (6), the magnet (6a), the SAW sensor (7) and the first antenna (8) have a common sheath (11).

9. Magnetic stirrer (1) according to claim 8, wherein the SAW sensor (7) and the first antenna (8) are fixed to the stirring rod (6) and/or to the magnet (6a) by means of the sheath (11).

10. Magnetic stirrer (1) according to claim 5, wherein the magnetic stirrer (1) has a second antenna (10).

11. Magnetic stirrer (1) according to claim 10, wherein the first and second antennas (8, 10) are designed for receiving and transmitting therebetween electromagnetic waves.

12. Magnetic stirrer (1) according to claim 10, wherein the second antenna (10) is arranged adjacent to the heating plate (3).

13. Magnetic stirrer (1) according to claim 1, comprising a data processing device for determining temperature readings on the basis of the output electrical signals generated by the transducer.

14. Magnetic stirrer (1) according to claim 13, comprising a display device (12) for displaying the determined temperature readings.

15. Magnetic stirrer (1) according to claim 13, wherein the magnetic stirrer (1) is connected to a control and/or regulating device, by means of which the stirring drive (2) and/or the heating plate (3) of the magnetic stirrer (1) can be controlled and/or regulated as a function of the determined temperature readings.

16. Magnetic stirrer (1) according to claim 15, wherein the control and/or regulating device is wirelessly connected to the magnetic stirrer (1).

17. Magnetic stirrer (1) according to claim 8, wherein the common sheath is composed of wholly or partly of plastic, ceramic, or stainless steel.

18. Magnetic stirrer (1) according to claim 8, wherein the stirring rod (6) is formed by the sheath (11) and the parts which are surrounded by the sheath (11).

19. Magnetic stirrer (1) according to claim 14, wherein the display device (12) is arranged on a housing of the magnetic stirrer (1).

20. Magnetic stirrer (1) according to claim 14, wherein the display device (15) is wirelessly connected to receive the determined temperature readings.

* * * * *